(12) United States Patent
Leem

(10) Patent No.: US 10,824,302 B2
(45) Date of Patent: Nov. 3, 2020

(54) INTERVAL SELECTION INTERFACE FOR A TOUCHSCREEN DEVICE

(71) Applicant: International Business Machines Corporation, Armonk, NY (US)

(72) Inventor: Jin Leem, Durham Country, NC (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/053,940

(22) Filed: Aug. 3, 2018

(65) Prior Publication Data

US 2020/0042142 A1 Feb. 6, 2020

(51) Int. Cl.
| | |
|---|---|
| *G06F 3/0482* | (2013.01) |
| *G06F 3/0488* | (2013.01) |
| *G06F 3/0485* | (2013.01) |
| *G06F 3/01* | (2006.01) |

(52) U.S. Cl.
CPC .......... *G06F 3/0482* (2013.01); *G06F 3/0485* (2013.01); *G06F 3/0488* (2013.01); *G06F 3/016* (2013.01)

(58) Field of Classification Search
CPC .... G06F 3/0482; G06F 3/0488; G06F 3/0485; G06F 3/016; G06F 3/04847; G06F 3/04886; G06F 2203/014; G06Q 10/109
USPC ................................................. 715/810, 205
See application file for complete search history.

(56) References Cited

U.S. PATENT DOCUMENTS

| | | | |
|---|---|---|---|
| 7,080,396 B2 | 7/2006 | Gong | |
| 7,703,048 B2 | 4/2010 | Alford, Jr. et al. | |
| 8,010,579 B2 | 8/2011 | Metsatahti et al. | |
| 8,786,565 B2* | 7/2014 | Kobayashi | H04M 1/0237 |
| | | | 178/18.06 |
| 8,990,732 B2 | 3/2015 | Farrenkopf et al. | |
| 2002/0056103 A1 | 5/2002 | Gong | |
| 2004/0204978 A1 | 10/2004 | Rayrole | |
| 2005/0108233 A1 | 5/2005 | Metsatahti et al. | |
| 2005/0108644 A1 | 5/2005 | Finke-Anlauff et al. | |
| 2007/0300163 A1 | 12/2007 | Alford et al. | |
| 2010/0185183 A1* | 7/2010 | Alme | A61M 5/14276 |
| | | | 604/891.1 |
| 2011/0283188 A1 | 11/2011 | Farrenkopf et al. | |

(Continued)

*Primary Examiner* — Andrey Belousov
(74) *Attorney, Agent, or Firm* — Richard Wilhelm; Edell, Shapiro & Finnan, LLC

(57) ABSTRACT

A computer system provides a user interface for selecting intervals on a touchscreen device. A user interface is generated with a plurality of interval elements each representing an interval within a sequence. Contact is detected on the screen by a user at a location corresponding to the interval element and associated with a selected interval. A plurality of adjustment elements are generated proximate to the selected interval, wherein the adjustment elements enable modification of a span of the selected interval and a position of the selected interval in the sequence. A selection of one or more adjustment elements is received. One or more from a group of the span and position of the selected interval are modified based on the selected one or more adjustment elements. Embodiments of the present invention further include a method and program product for providing a user interface for selecting intervals on a touchscreen device in substantially the same manner described above.

18 Claims, 8 Drawing Sheets

(56) References Cited

U.S. PATENT DOCUMENTS

2013/0191710 A1* 7/2013 Skrenta ............... G06F 16/9535
715/205
2015/0177976 A1 6/2015 Ionescu et al.
2016/0092844 A1 3/2016 Zhang et al.
2017/0124517 A1 5/2017 Martin

* cited by examiner

INTERVAL SELECTION INTERFACE FOR A TOUCHSCREEN DEVICE

BACKGROUND

1. Technical Field

Present invention embodiments relate to user interfaces, and more specifically, to a user interface for selecting intervals on a touchscreen device.

2. Discussion of the Related Art

A touchscreen is an input device normally layered on the top of a visual display of a computing system, such as a laptop or a smartphone. A user can provide input by touching a touchscreen with one or more fingers or with a stylus. The touchscreen enables the user to interact directly with a display, rather than using a mouse, keyboard, or other such input devices.

When a user interacts with a touchscreen, the user may struggle to precisely select a particular user interface element due to the element's size on the display in relation to the user's fingers. Users may also have difficulty performing certain input actions, particularly when the action requires heavy scrolling or swiping. While enlarging the size of a user interface element may enable a user to more easily select the element, enlarging elements is not always an option for crowded user interfaces or for devices that have smaller touchscreens.

SUMMARY

According to one embodiment of the present invention, a computer system provides a user interface for selecting intervals on a touchscreen device. A user interface is generated with a plurality of interval elements each representing an interval within a sequence. Contact is detected on the screen by a user at a location corresponding to the interval element and associated with a selected interval. A plurality of adjustment elements are generated proximate to the selected interval, wherein the adjustment elements enable modification of a span of the selected interval and a position of the selected interval in the sequence. A selection of one or more adjustment elements is received. One or more from a group of the span and position of the selected interval are modified based on the selected one or more adjustment elements. Embodiments of the present invention further include a method and program product for providing a user interface for selecting intervals on a touchscreen device in substantially the same manner described above.

BRIEF DESCRIPTION OF THE DRAWINGS

Generally, like reference numerals in the various figures are utilized to designate like components.

DETAILED DESCRIPTION

Figure 1:
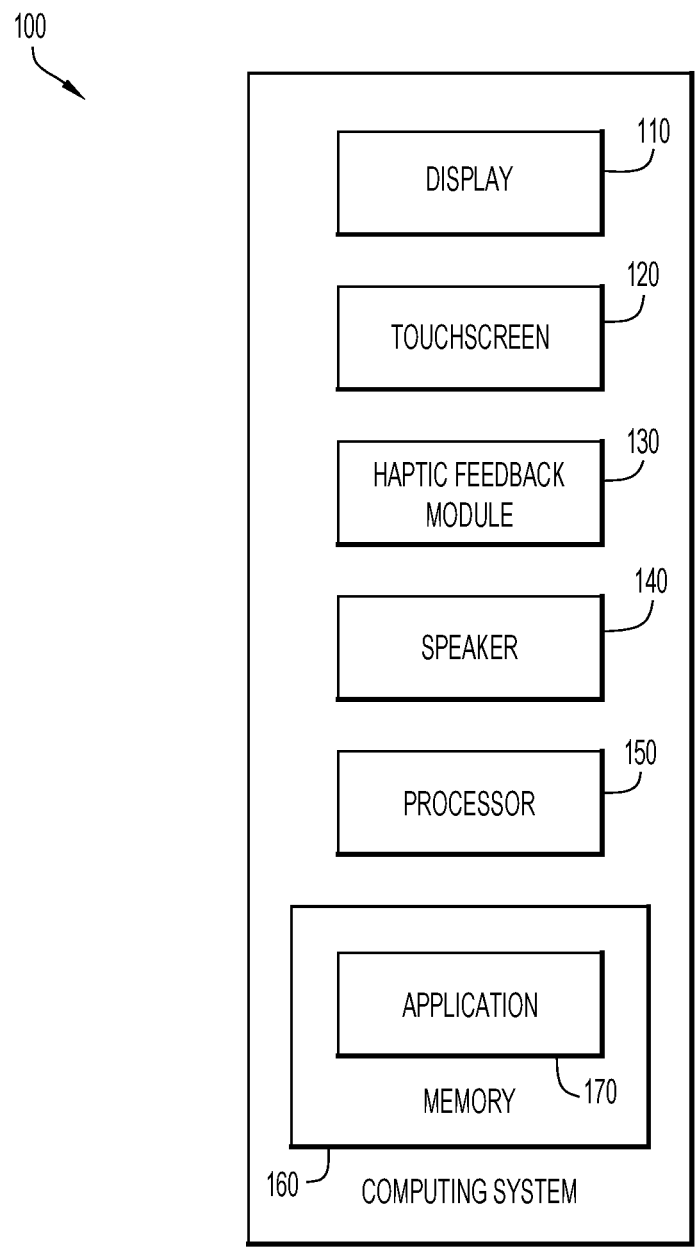
FIG. 1 is a block diagram depicting a computing system for selecting intervals using a touchscreen in accordance with an embodiment of the present invention.

Present invention embodiments relate to user interfaces for making selections on a touchscreen device, and more specifically, to user interfaces for selecting intervals on a touchscreen device. An interval may refer to any portion of a sequence, and can be defined in terms of the interval's beginning and end points. An interval may be a time interval, such as a particular block of time in a day, or any other sort of interval, such as a particular span or percentage of space or items, volume of data, and the like.

When a user desires to select an interval using a touchscreen device, the user may be required to select the placement and duration/span of an interval within a sequence. For example, when a user selects a time interval, the user may select a start time and an end time (or a duration for the time interval). One conventional approach to interval selection is a time picker, which is a user interface element that provides a scrollable list of times; however, a time picker may require a user to perform several swipe interactions to pick the desired time. Another interval selection mechanism is a pop-up overlay, which obscures portions of the display, drawing a user's attention away from the context of the selection. Present invention embodiments enable a user to select intervals on a user interface via a touchscreen device using tap interactions, thus avoiding the use of inherently imprecise gestures (such as swiping or pressing-and-dragging) and without requiring a distracting pop-up overlay. By using tap interactions only, a user may quickly and efficiently select an interval in a manner that minimizes potential mistakes from errant finger-presses. Aspects of the interval selection interface may be included in one or more layers that are added over an application's pre-existing user interface, enabling the interval selection interface to be overlaid over any application that receives input pertaining to intervals.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing system 100 for generating a user interface for selecting intervals using a touchscreen in accordance with an embodiment of the present invention. As depicted, computing system 100 includes a display 110, a touchscreen 120, a haptic feedback module 130, a speaker 140, a processor 150, and memory 160 with at least one application 170. It is to be understood that the functional division among components of computing system 100 have been chosen for purposes of explaining the present invention and is not to be construed as a limiting example.

In various embodiments of the present invention, computing system 100 may include a laptop computer, a tablet computer, a netbook computer, a personal computer (PC), a desktop computer, a personal digital assistant (PDA), a smart phone, a thin client, or any programmable electronic device capable of executing computer readable program instructions. Computing system 100 may include internal and external hardware components, as depicted and described in further detail with respect to FIG. 4.

Display 110 includes any electronic device capable of presenting information in a visual form. For example, display 110 may be a liquid crystal display (LCD), a light-emitting diode (LED) display, an electronic ink display, and the like. Touchscreen 120 may include any input device, such as a resistive or capacitive touchscreen, with which a user may interact via one or more fingers or with a stylus. A resistive touchscreen includes two flexible sheets coated in a resistive material and separated by a gap, such as an air gap. When pressure is applied, the outer layer is pushed through the air gap to the inner layer, and input is registered at the point of contact of the two layers. Capacitive touchscreens detect input by an object, such as a finger or a stylus, by sensing a charge in the object when it is positioned in proximity to the touchscreen. Touchscreen 120 may be layered over or under display 110 so that when a user interacts with an interface element presented on display 110, touchscreen 120 receives the user's input in a location that corresponds to the interface element presented on display 110.

Haptic feedback module 130 stimulates a user to engage the user's sense of touch by applying a force, vibration, or other motion to computing system 100. Haptic feedback module 130 may stimulate a user interacting with computing system 100 using an eccentric rotating mass actuator, a linear resonant actuator, a piezoelectric actuator, and the like. Speaker 140 may include any transducer capable of converting an electrical signal to sound. In some embodiments, haptic feedback module 130 and/or speaker 140 provides a user with haptic and/or audio feedback, respectively, to acknowledge the user's interactions with computing system 100. For example, haptic feedback module 130 may provide a particular haptic feedback pattern, or speaker 140 may play a certain sound, when a user interacts with touchscreen 120 to select an interval.

Application 170 may include one or more modules or units to perform various functions of present invention embodiments described below. Application 170 may be implemented by any combination of any quantity of software and/or hardware modules or units, and may reside within memory 170 of user device 110 for execution by a processor, such as processor 160.

A user interacts with application 170 via a user interface presented on display 110. Application 170 may present a user interface that includes various intervals that can be selected by a user. In some embodiments, application 170 is a schedule or planner application, and a user can make selections of time intervals in order to manage and personalize their schedule. Application 170 may include any application that involves the selection of intervals of time, space, data, or other selectable quantities; for example, application 170 may include a calendar, a data management utility, an inventory management utility, a database application, a media playback and/or editing application, an electronic game, and the like.

Figure 2:
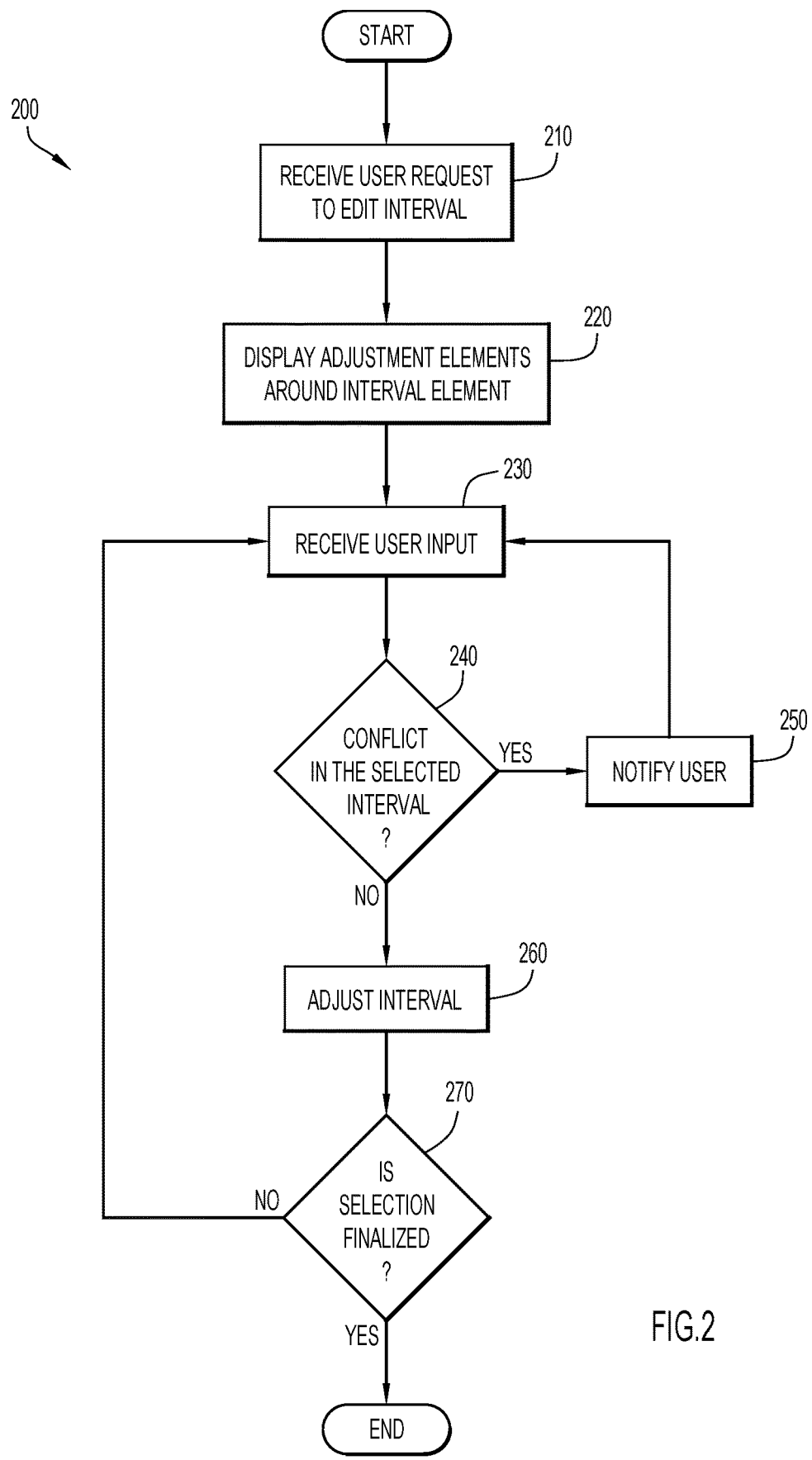
FIG. 2 is a flow chart depicting a method of selecting an interval on a touchscreen device in accordance with an embodiment of the present invention.

FIG. 2 is a flow chart depicting a method 200 of selecting an interval on a user interface via a touchscreen device in accordance with an embodiment of the present invention.

A user request to edit an interval is received at operation 210. A user may open an application, such as application 170, and input a command to request to edit an interval. A user may interact with a graphical user interface element shown on display 110, such as an interval element, to request editing an interval. A user may interact with the graphical user interface element by tapping or clicking a location on touchscreen 120 corresponding to the element. In some embodiments, the user performs a particular gesture or action on touchscreen 120, such as a single-tap, a double-tap, a long tap, a hard tap (e.g., a tap using an amount of force that exceeds a threshold), a swipe, or any other conventional action or combination of actions.

Adjustment elements are displayed around an interval element at operation 220. The adjustment elements may include elements to adjust a selected interval, which is selected by default in response to the user requesting to edit an interval. Elements may be displayed around the default interval that enable a user to adjust the span, start point, and/or endpoint of the interval. In some embodiments, a pair of adjustment elements can be used move the selected interval without changing the span of the interval, and another pair of adjustment elements can be used to move the start and stop points independently to modify the span of the selected interval. For example, in a schedule application, the default interval that is selected may be a one-hour block of time; one pair of adjustment elements enables the one-hour block to be moved forward or backward in time, and another pair of adjustment elements moves the start or end point forward or backward in time independently of the other start or end point, changing the duration of the selected time block. The user may interact with the adjustment elements by performing a single-tap gesture. The interval element and/or adjustment elements may be presented in a layer above the graphical user interface of application 170. In some embodiments, the interval and adjustment elements are included in a layer that is scalable so that elements can be presented at an appropriate size relative to the graphical user interface of any application (e.g., not overly large or small, not overlapping other elements of an application, etc.) on computing system 100, such as application 170. In some embodiments, the adjustment elements are presented only when a conventional selection mechanism, such as a time picker or pop-up element, would obscure a portion of display and/or overlap other specified graphic elements.

User input is received at operation 230. A user may interact with portions of touchscreen 120 corresponding to adjustment elements to provide input. When a user provides input to adjust a selected interval, operation 240 determines whether there is a conflict in the selected interval. A conflict may be determined if the user's proposed interval selection would overlap with a previously-allocated interval. For example, if the user attempts to schedule a meeting from 9:15 AM to 9:30 AM, but the user's schedule is already occupied from 9:00 AM to 9:20 AM, then operation 240 would determine that there is a conflict, and method 200 proceeds to operation 250. The presence of a conflict may be determined each time a user interacts with an adjustment element. In some embodiments, the presence of a conflict is determined after several interactions; for example, a user may interact two or more times in a row with adjustment elements, and the existence of a conflict may be determined after the user ceases to interact with the adjustment elements for a predetermined amount of time.

The user is notified of a potential conflict at operation 250. The user may be notified by a notification that is displayed on display 110, by a particular sound played via speaker 140, by a particular haptic feedback pattern provided by haptic feedback module 130, and/or by any other conventional or other notification mechanism. In some embodiments, the selection may change colors (e.g., turn from green to red, etc.) or flash to indicate a conflict in the proposed selection.

If there is not a conflict, the interval is adjusted at operation 260. The interval is modified according to the user's input to the adjustment elements. Once the user-requested modifications are made to the selected interval, operation 270 determines whether the user's selection of an interval is finalized. A user may finalize the selection of an interval by interacting with touchscreen 120 by performing an action such as a single-tap, a double-tap, a long tap, a hard tap (e.g., a tap using an amount of force that exceeds a threshold), a swipe, or any other conventional action or combination of actions. In some embodiments, a user performs an action in a location on touchscreen 120 that is away from the interval and adjustment elements. For example, a user may tap a corner of touchscreen 120 or a portion of touchscreen 120 that is at least some predetermined distance away from the interval and adjustment elements. A user may choose not to finalize a selection by continuing to interact with the adjustment elements, in which case, method 200 may return to operation 230 to receive additional user input.

FIGS. 3A-3E illustrate examples of a user interface 300 for selecting intervals on a touchscreen device in accordance with an embodiment of the present invention. User interface 300 may correspond to a user interface for application 170.

Figure 3A:
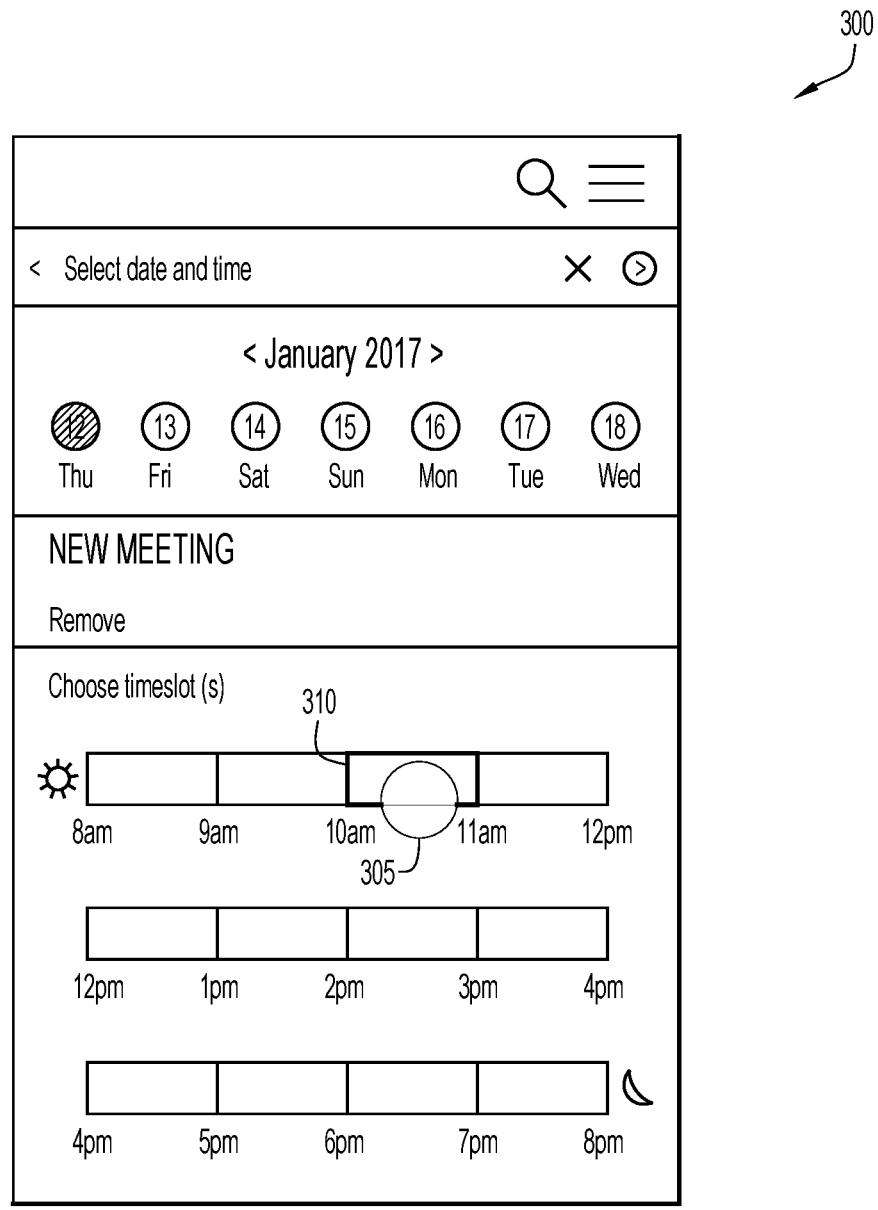
FIGS. 3A-3E illustrate examples of a user interface for selecting intervals on a touchscreen device in accordance with an embodiment of the present invention.

FIG. 3A depicts an example of a user interface 300 with an interval 310 that is selected. Input indicator 305 is included for the purposes of illustrating where a user is providing input to touchscreen 120, and as such, input indicator 305 may not be shown on display 110. The interval element may be divided into default subdivisions. As depicted, the time interval is organized into one-hour blocks; however, an interval may be divided into blocks of any size. As depicted, a user has selected a one-hour block from 10 AM to 11 AM.

Figure 3B:
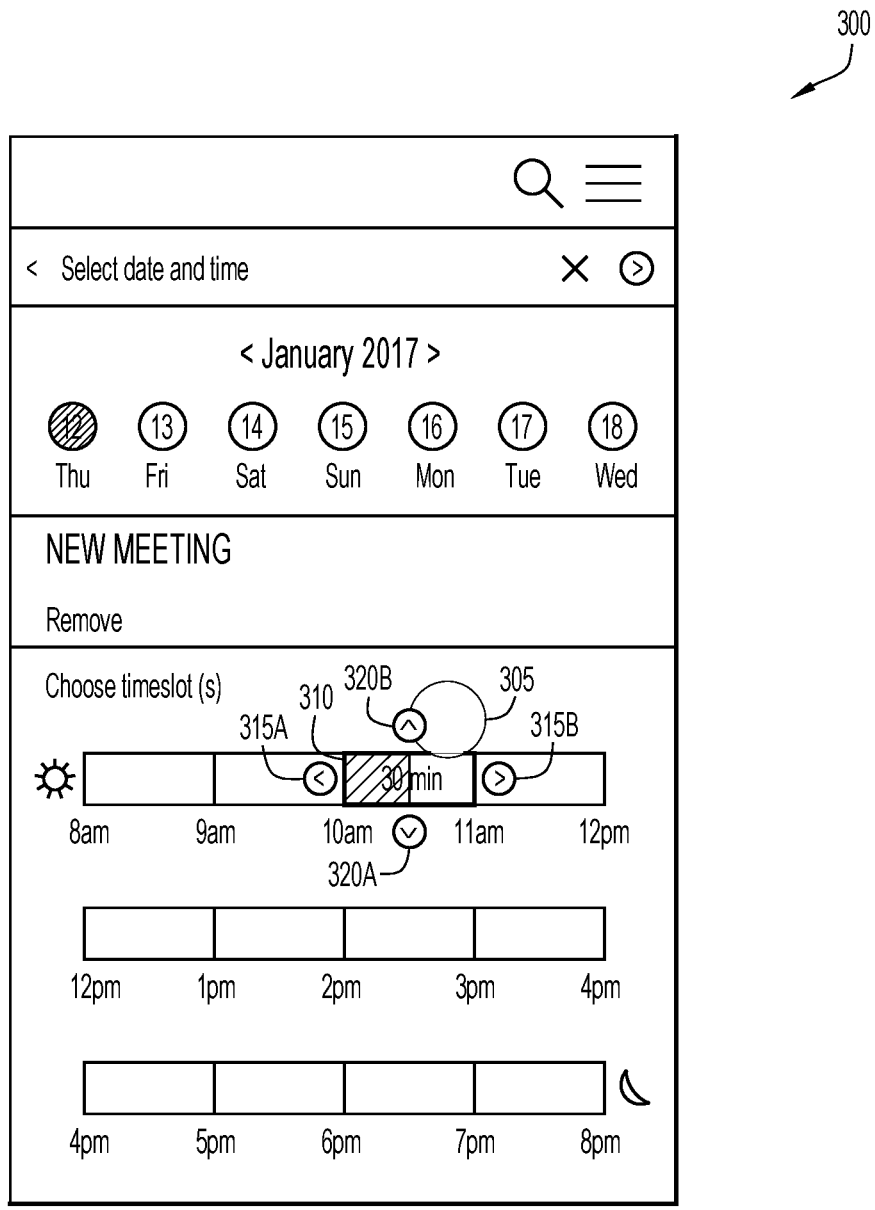

FIG. 3B illustrates an example of user interface 300 in which a user has requested to edit an interval by selecting a portion of an interval corresponding to a block of time from 10 AM to 11 AM. Initially, a default amount of time for interval 310 within the one-hour block is presented: interval 310 is a thirty-minute interval that starts at 10 AM and extends to 10:30 AM. In response to selecting the interval, adjustment elements 315A, 315B, 320A, and 320B are displayed on user interface 300. In some embodiments, adjustment elements 315A, 315B, 320A, and 320B are at least 29 pixels in width. In some embodiments, adjustment elements 315A, 315B, 320A, and 320B are 35 pixels in width. Adjustment elements 320A and 320B may be used to adjust the span of interval 310, and adjustment elements 315A and 315B may be used to change the start point and end point of interval 310. As shown by input indicator 305, a user has tapped adjustment element 320B, which extends the duration of interval 310.

Figure 3C:
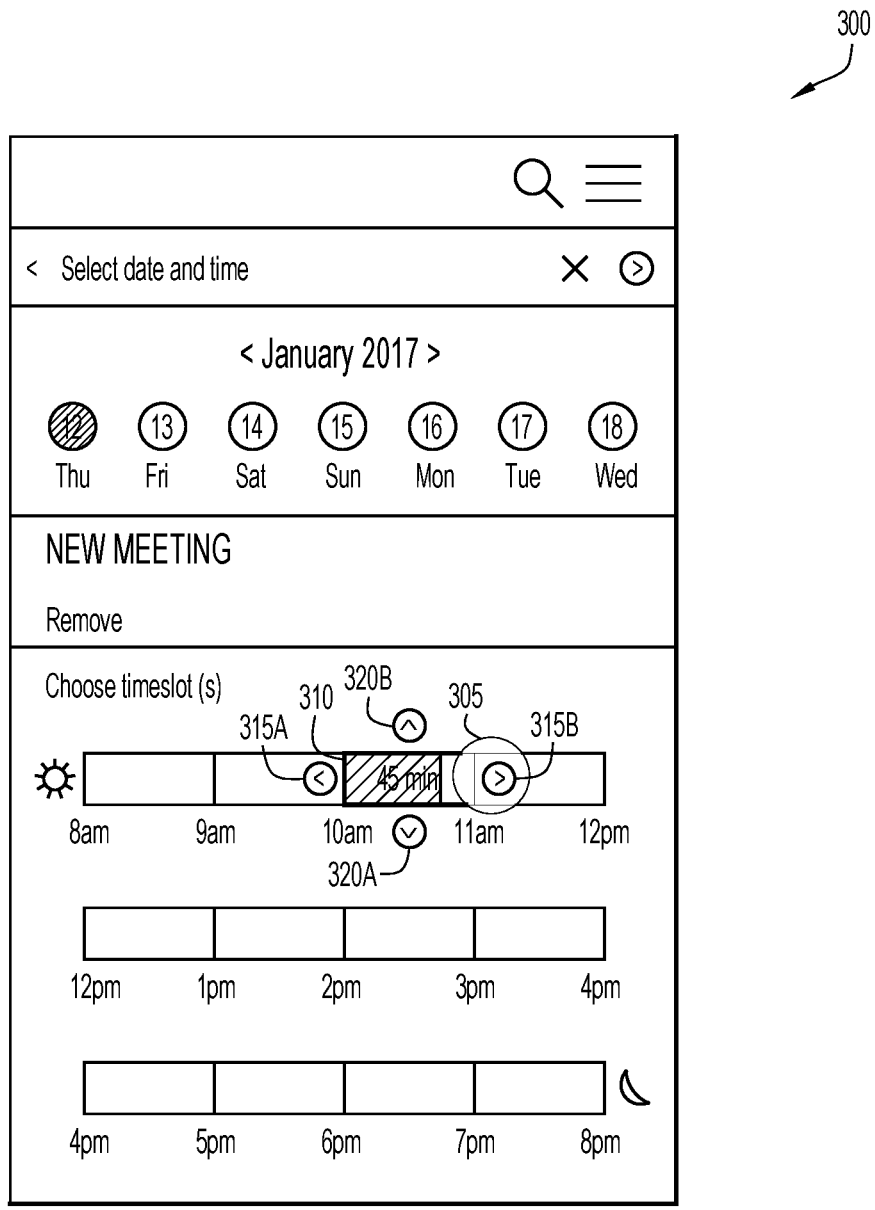

FIG. 3C illustrates an example of user interface 300 in which a user has previously requested to extend the duration of interval 310. As depicted, interval 310 is now forty-five minutes in duration. Interacting with adjustment elements 320A and 320B may modify the span of interval 310 by a predetermined amount; in the depicted example, interacting with 320B added fifteen minutes to interval 310, thus extending the duration of interval 310 to forty-five minutes. In various embodiments, the amount by which an interval's span is changed per each interaction with an adjustment element can be any predetermined value. The amount by which an interval's span is changed may be a user-configurable option. As shown by input indicator 305, a user has now tapped adjustment element 315B, which shifts interval 310 to the right (e.g., forward in time).

Figure 3D:
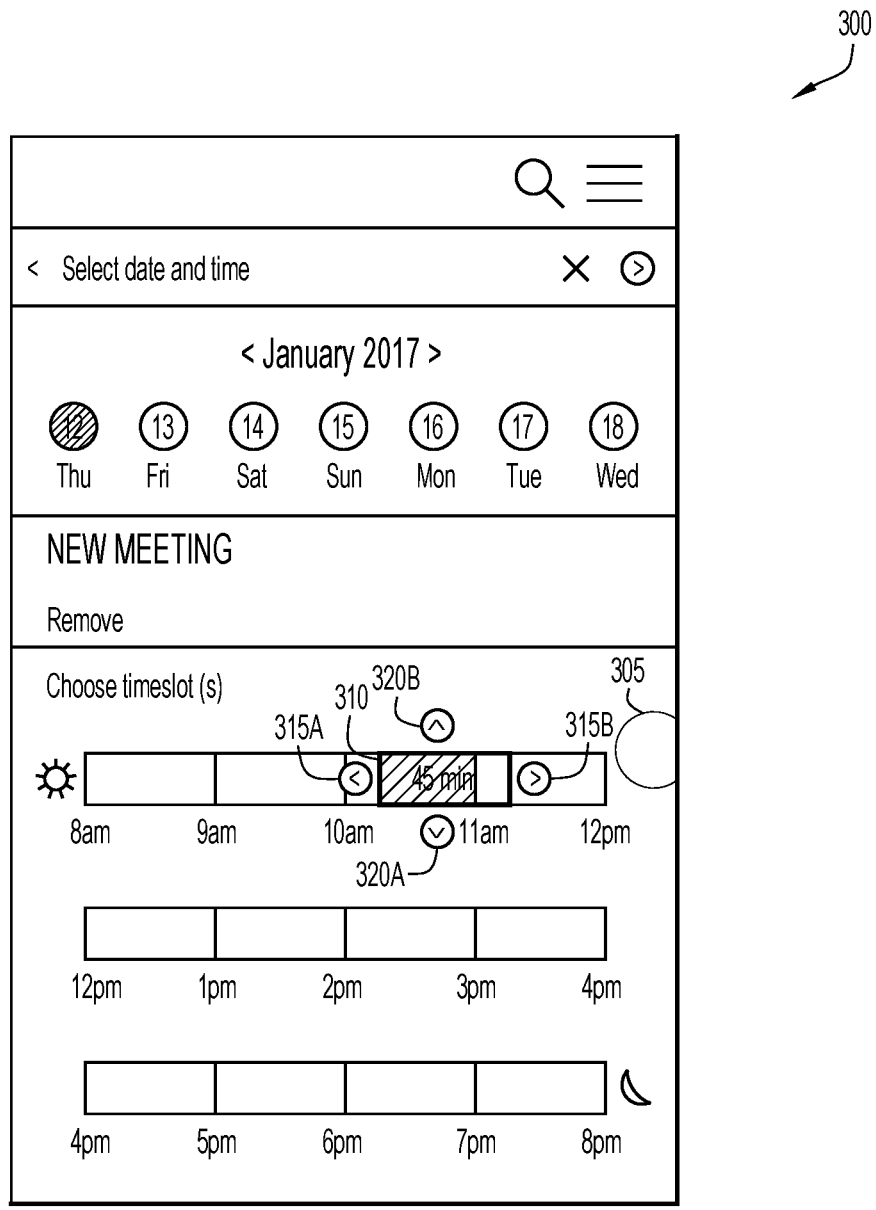
Figure 3E:
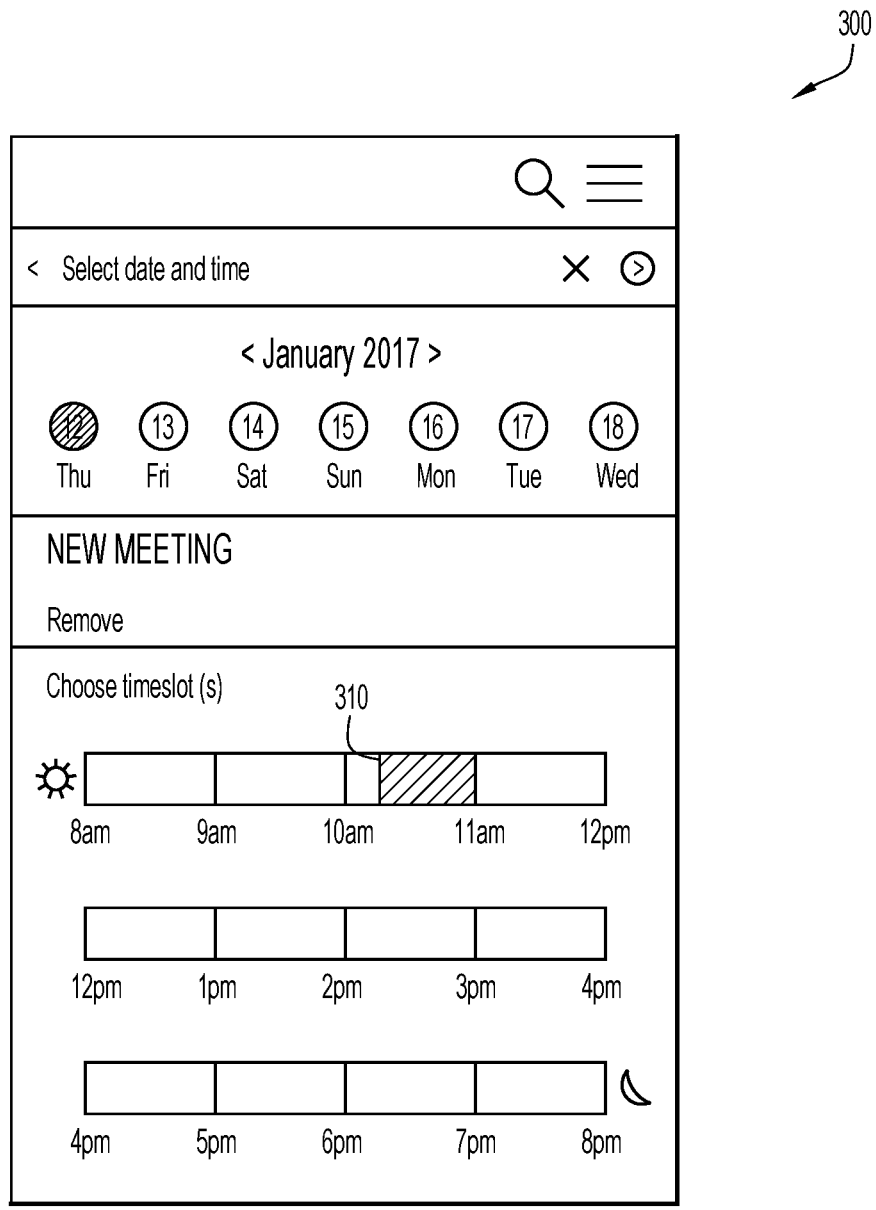

FIG. 3D depicts an example of user interface 300 after a user has tapped adjustment element 315B. Compared to FIG. 3C, interval 310 as depicted in FIG. 3D has been shifted forward in time fifteen minutes, and now spans a time block from 10:15 AM to 11:00 AM. Similarly, tapping adjustment element 315A would shift interval 310 backward some amount of time. In the depicted example, interacting with 315B shifted interval 310 by fifteen minutes; however, in various other embodiments, the amount by which an interval is shifted per each interaction with an adjustment element can be any predetermined value. The amount by which an interval is shifted may be a user-configurable option. As shown by input indicator 305, the user has indicated that the user has finished selecting an interval by tapping touchscreen 120 in a location that is away from the adjustment elements. FIG. 3E depicts an example of user interface 300 after a user has finished selecting a time interval 305. The adjustment elements may no longer be displayed, leaving interval 310 to be displayed as a filled-in block of time on user interface 300.

Figure 4:
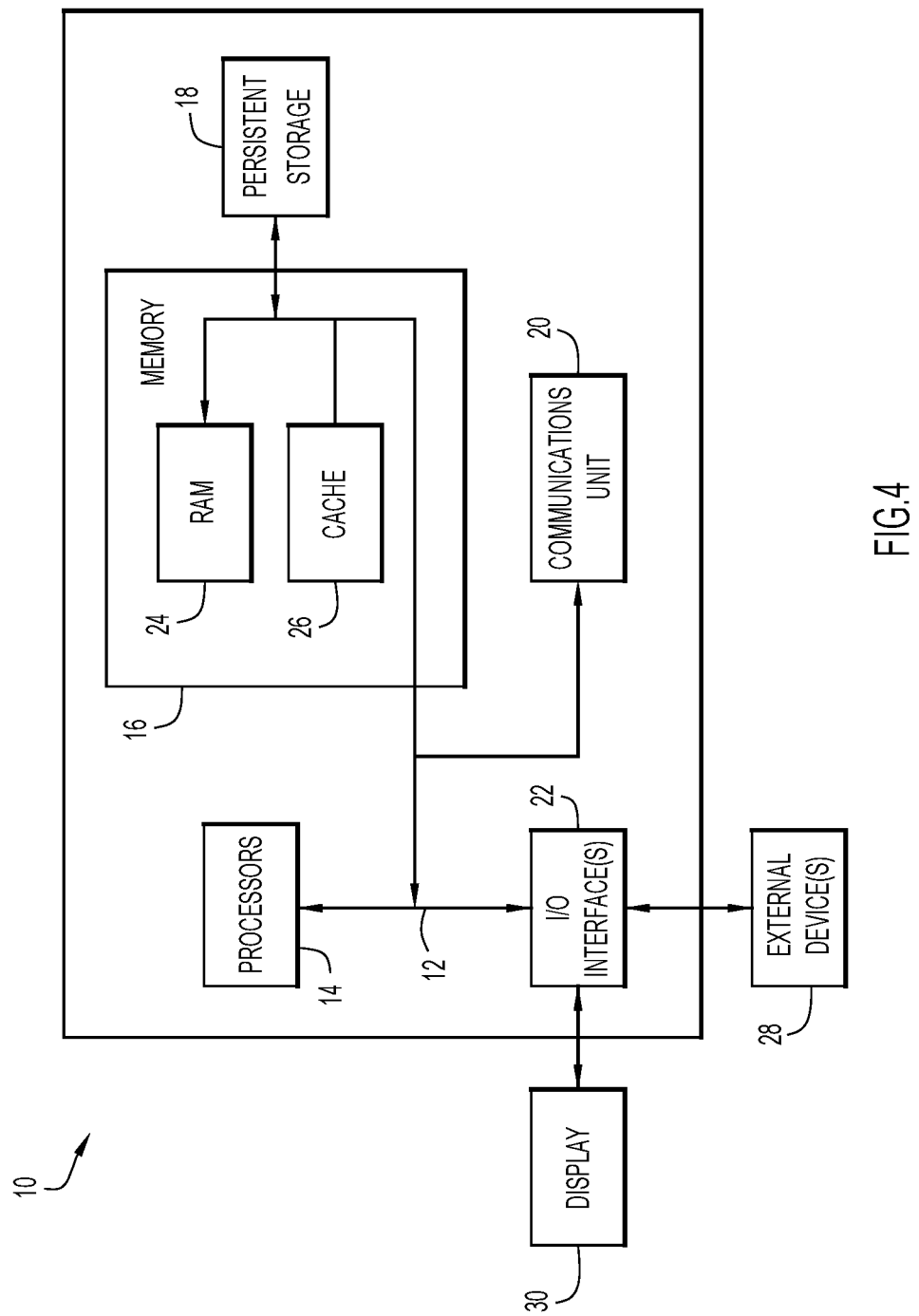
FIG. 4 is a block diagram depicting a computing device in accordance with an embodiment of the present invention.

FIG. 4 is a block diagram depicting components of a computer 10 suitable for executing the methods disclosed herein. Computer 10 may enable computing device 100 to present a user interface to receive interval selections in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to intervals and/or interval selection may be stored within any conventional or other data structures (e.g., files, arrays, lists, stacks, queues, records, etc.) and may be stored in any desired storage unit (e.g., database, data or other repositories, queue, etc.). The data stored in computing system 100 may include any desired format and arrangement, and may include any quantity of any types of fields of any size to store the data. The definition and data model for any data relating to intervals and/or interval selection may indicate the overall structure in any desired fashion (e.g., computer-related languages, graphical representation, listing, etc.).

Intervals may include any measureable portion of any continuum that can be defined by a start point and an end point. The span of an interval may correspond to any discrete or continuous value. An interval may include intervals and/or be itself part of an interval.

Data relating to intervals and/or interval selection, such as start points, end points, and/or durations of intervals, may include any information provided to computing system 100. Data relating to intervals and/or interval selections may include any desired format and arrangement, and may include any quantity of any types of fields of any size to store any desired data.

The present invention embodiments may employ any number of any type of user interface (e.g., Graphical User Interface (GUI), command-line, prompt, etc.) for obtaining or providing information (e.g., data relating to intervals and/or interval selections), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for selecting intervals on a touchscreen interface.

The environment of the present invention embodiments may include any number of computer or other processing systems (e.g., client or end-user systems, server systems, nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., user interface software, input/output software, application 170, etc.). These systems may include any types of monitors and input devices (e.g., keyboard, mouse, voice recognition, etc.) to enter and/or view information.

It is to be understood that the software (e.g., user interface software, input/output software, application 170, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., user interface software, input/output software, application 170, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The system may employ any number of any conventional or other databases, data stores or storage structures (e.g., files, databases, data structures, data or other repositories, etc.) to store information (e.g., data relating to intervals and interval selection). The database system may be implemented by any number of any conventional or other databases, data stores or storage structures (e.g., files, databases, data structures, data or other repositories, etc.) to store information (e.g., data relating to intervals and interval selection). The database system may be included within or coupled to the server and/or client systems. The database systems and/or storage structures may be remote from or local to the computer or other processing systems, and may store any desired data (e.g., data relating to intervals and interval selection).

The present invention embodiments may employ any number of any type of user interface (e.g., Graphical User Interface (GUI), command-line, prompt, etc.) for obtaining or providing information (e.g., data relating to intervals and interval selection), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for selecting intervals, the method comprising:
   generating a user interface with a plurality of interval elements each representing an interval within a sequence;
   detecting contact on the screen by a user at a location corresponding to the interval element and associated with a selected interval;
   generating a plurality of adjustment elements proximate to the selected interval, wherein the adjustment elements enable modification of a span of the selected interval and a position of the selected interval in the sequence, wherein the span and position of the selected interval are represented using an interval element including a perimeter comprising different sections with one adjustment element per perimeter section;
   receiving a selection of one or more adjustment elements;
   modifying one or more from a group of the span and position of the selected interval based on the selected one or more adjustment elements, wherein the selected interval is modified by a predetermined amount per selection of the one or more adjustment elements; and
   finalizing modification of the selected interval and removing the plurality of adjustment elements in response to detecting contact on the screen by a user at a location that is a predetermined distance away from the selected interval.

2. The computer-implemented method of claim 1, wherein the interval comprises a time interval.

3. The computer-implemented method of claim 2, wherein the plurality of adjustment elements enable modification of a start time of the time interval.

4. The computer-implemented method of claim 2, wherein the plurality of adjustment elements enable modification of the span of the time interval.

5. The computer-implemented method of claim 3, wherein the plurality of adjustment elements that enable modification of the start time of the time interval include a pair of adjustment elements proximate to the interval, wherein the pair of adjustment elements comprises an adjustment element to a first side of the time interval and an adjustment element to a second side of the time interval.

6. The computer-implemented method of claim 4, wherein the plurality of adjustment elements that enable modification of the span of the time interval include a pair of adjustment elements proximate to the interval, wherein the pair of adjustment elements comprises an adjustment element above the time interval and an adjustment element below the time interval.

7. A computer system for selecting time intervals, the computer system comprising:
   one or more computer processors;
   one or more computer readable storage media;
   program instructions stored on the one or more computer readable storage media for execution by at least one of the one or more computer processors, the program instructions comprising instructions to:
   generate a user interface with a plurality of interval elements each representing an interval within a sequence;
   detect contact on the screen by a user at a location corresponding to the interval element and associated with a selected interval;
   generate a plurality of adjustment elements proximate to the selected interval, wherein the adjustment elements enable modification of a span of the selected interval and a position of the selected interval in the sequence, wherein the span and position of the selected interval are represented using an interval element including a perimeter comprising different sections with one adjustment element per perimeter section;

receive a selection of one or more adjustment elements;

modify one or more from a group of the span and position of the selected interval based on the selected one or more adjustment elements, wherein the selected interval is modified by a predetermined amount per selection of the one or more adjustment elements; and finalize modification of the selected interval and remove the plurality of adjustment elements in response to detecting contact on the screen by a user at a location that is a predetermined distance away from the selected interval.

8. The computer system of claim 7, wherein the interval comprises a time interval.

9. The computer system of claim 8, wherein the plurality of adjustment elements enable modification of a start time of the time interval.

10. The computer system of claim 8, wherein the plurality of adjustment elements enable modification of the span of the time interval.

11. The computer system of claim 9, wherein the plurality of adjustment elements that enable modification of the start time of the time interval include a pair of adjustment elements proximate to the interval, wherein the pair of adjustment elements comprises an adjustment element to a first side of the time interval and an adjustment element to a second side of the time interval.

12. The computer system of claim 10, wherein the plurality of adjustment elements that enable modification of the span of the time interval include a pair of adjustment elements proximate to the interval, wherein the pair of adjustment elements comprises an adjustment element above the time interval and an adjustment element below the time interval.

13. A computer program product for selecting intervals, the computer program product comprising one or more computer readable storage media collectively having program instructions embodied therewith, the program instructions executable by a computer to cause the computer to:

generate a user interface with a plurality of interval elements each representing an interval within a sequence;

detect contact on the screen by a user at a location corresponding to the interval element and associated with a selected interval;

generate a plurality of adjustment elements proximate to the selected interval, wherein the adjustment elements enable modification of a span of the selected interval and a position of the selected interval in the sequence, wherein the span and position of the selected interval are represented using an interval element including a perimeter comprising different sections with one adjustment element per perimeter section;

receive a selection of one or more adjustment elements;

modify one or more from a group of the span and position of the selected interval based on the selected one or more adjustment elements, wherein the selected interval is modified by a predetermined amount per selection of the one or more adjustment elements; and finalizing modification of the selected interval and removing the plurality of adjustment elements in response to detecting contact on the screen by a user at a location that is a predetermined distance away from the selected interval.

14. The computer program product of claim 13, wherein the interval comprises a time interval.

15. The computer program product of claim 14, wherein the plurality of adjustment elements enable modification of a start time of the time interval.

16. The computer program product of claim 14, wherein the plurality of adjustment elements enable modification of the span of the time interval.

17. The computer program product of claim 15, wherein the plurality of adjustment elements that enable modification of the start time of the time interval include a pair of adjustment elements proximate to the interval, wherein the pair of adjustment elements comprises an adjustment element to a first side of the time interval and an adjustment element to a second side of the time interval.

18. The computer program product of claim 16, wherein the plurality of adjustment elements that enable modification of the span of the time interval include a pair of adjustment elements proximate to the interval, wherein the pair of adjustment elements comprises an adjustment element above the time interval and an adjustment element below the time interval.

* * * * *